United States Patent
Lee

(10) Patent No.: US 8,681,245 B2
(45) Date of Patent: Mar. 25, 2014

(54) DIGITAL PHOTOGRAPHING APPARATUS, AND METHOD FOR PROVIDING BOKEH EFFECTS

(75) Inventor: Jae-myung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/442,969

(22) Filed: Apr. 10, 2012

(65) Prior Publication Data
US 2013/0010184 A1 Jan. 10, 2013

(30) Foreign Application Priority Data
Jul. 7, 2011 (KR) .................. 10-2011-0067541

(51) Int. Cl.
*H04N 5/262* (2006.01)
*G01T 1/161* (2006.01)
*H04N 5/238* (2006.01)

(52) U.S. Cl.
USPC .................. 348/239; 348/363; 250/363.06

(58) Field of Classification Search
USPC ........................................................ 348/239
See application file for complete search history.

(56) References Cited

U.S. PATENT DOCUMENTS

| | | | | |
|---|---|---|---|---|
| 5,267,333 A * | 11/1993 | Aono et al. | .................... | 382/166 |
| 6,737,652 B2 * | 5/2004 | Lanza et al. | ............. | 250/363.06 |
| 6,973,264 B2 * | 12/2005 | Iwane | .......................... | 396/111 |
| 7,009,635 B2 * | 3/2006 | Rantalainen | .................. | 348/136 |
| 8,212,914 B2 * | 7/2012 | Chiu | ............................. | 348/345 |
| 8,288,704 B2 * | 10/2012 | Perlman et al. | ............... | 250/216 |
| 2008/0124070 A1 * | 5/2008 | Liang et al. | .................... | 396/435 |
| 2010/0201865 A1 * | 8/2010 | Han et al. | ...................... | 348/362 |
| 2011/0085074 A1 * | 4/2011 | Sonoda et al. | ................ | 348/363 |

* cited by examiner

*Primary Examiner* — Ngoc-Yen Vu
(74) *Attorney, Agent, or Firm* — Drinker Biddle & Reath LLP

(57) ABSTRACT

A digital photographing apparatus in which iris patterns that have various shapes are provided. The digital photographing apparatus includes a lens unit; an iris in which an iris pattern, that defines a transmission area of incident light according to a signal, is determined; an imaging device that converts the incident light into an electrical signal; and an iris control unit which controls to form the iris pattern in the iris.

16 Claims, 7 Drawing Sheets

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

■ NON-TRANSMISSION AREA
☐ TRANSMISSION AREA

DIGITAL PHOTOGRAPHING APPARATUS, AND METHOD FOR PROVIDING BOKEH EFFECTS

CROSS-REFERENCE TO RELATED PATENT APPLICATION

This application claims the benefit of Korean Patent Application No. 10-2011-0067541, filed on Jul. 7, 2011, in the Korean Intellectual Property Office, the disclosure of which is incorporated herein in its entirety by reference.

BACKGROUND

1. Field of the Invention

One or more embodiments relate to a digital photographing method, a method of controlling the same, and a computer-readable storage medium for performing the method.

2. Description of the Related Art

Digital photographing apparatuses receive an optical signal and convert the optical signal into an electrical signal to generate an image. The digital photographing apparatuses include a lens unit, an iris, and an imaging device for generating an electrical imaging signal by concentrating an optical signal on the imaging device. An aperture size of the iris may be adjusted, and a depth of field and an exposure time of an image may vary according to the aperture size of the iris.

SUMMARY

One or more aspects can provide iris patterns that have various shape areas supplied to a digital photographing apparatus.

According to an aspect, there is provided a digital photographing apparatus including a lens unit; an iris in which an iris pattern, that defines a transmission area of incident light according to a signal, is determined; an imaging device that converts the incident light into an electrical signal; and an iris control unit which controls to form the iris pattern in the iris.

The iris control unit may determine the iris pattern according to a user input.

The iris control unit may determine a size of the transmission area according to an iris opening setting.

The iris control unit may adjust a transmission degree of the transmission area to three or more states.

The digital photographing apparatus may further include a post processing unit which generates a first image captured using a default iris pattern, a second image captured using an iris pattern selected by a user, and a resultant image by synthesizing the first and second images.

The digital photographing apparatus may further include a subject detection unit that detects a main subject, and a post processing unit that provides an resolution of the main subject.

The digital photographing apparatus may further include an iris pattern generation unit that generates the iris pattern according to a user input.

The digital photographing apparatus may further include an iris pattern generation unit that generates the iris pattern according to a shape of an object in an input image.

According to another aspect, there is provided a method of controlling a digital photographing apparatus, wherein the digital photographing apparatus comprises an iris in which an iris pattern, for defining a transmission area of incident light according to an electrical signal, is determined. The method includes determining the iris pattern according to a user input, controlling to form the iris pattern in the iris, and capturing an image.

The method may further include determining a size of the transmission area according to an iris opening setting.

The method may further include adjusting a transmission degree of the transmission area to three or more states.

The method may further include generating a first image by photographing using a default iris pattern, generating a second image by photographing using the iris pattern determined by the user input, and generating a resultant image by synthesizing the first and second images.

The method may further include detecting a main subject from a captured image and improving a resolution of the main subject.

The method may further include generating the iris pattern according to a user input.

The method may further include generating the iris pattern according to a shape of an object included in an input image.

According to another aspect, there is provided a non-transitory computer-readable recording medium for storing computer program code which performs a method of controlling a digital photographing apparatus when the computer program code is read and executed by a processor, wherein the digital photographing apparatus may include an iris in which an iris pattern, for defining a transmission area of incident light according to an electrical signal, is determined, and wherein the method of controlling a digital photographing apparatus may include determining the iris pattern according to a user input, controlling to form the iris pattern in the iris, and capturing an image.

The method may further include determining a size of the transmission area according to an iris opening setting.

The method may further include adjusting a transmission degree of the transmission area to three or more states.

The method may further include generating a first image by photographing using a default iris pattern, generating a second image by photographing using the iris pattern according to the user input, and generating a resultant image by synthesizing the first and second images.

The method may further include detecting a main subject from the captured image and improving a resolution of the main subject.

The method may further include generating the iris pattern according to the user input.

The method may further include generating the iris pattern according to a shape of an object in an input image.

BRIEF DESCRIPTION OF THE DRAWINGS

The above and other features and advantages will become more apparent by describing in detail exemplary embodiments thereof with reference to the attached drawings in which.

DETAILED DESCRIPTION

The following description and accompanying drawings are provided for better understanding of the embodiments. In the following description, well-known functions or constructions are not described in detail if it is determined that they would obscure the invention due to unnecessary detail.

The following description and drawings are not intended to restrict the scope of the invention, and the scope of the invention should be defined by the appended claims. The terms used in the following description are merely used to describe exemplary embodiments and are not intended to limit the present invention.

Hereinafter, exemplary embodiments will be described in detail by explaining the exemplary embodiments with reference to the attached drawings.

Figure 1:
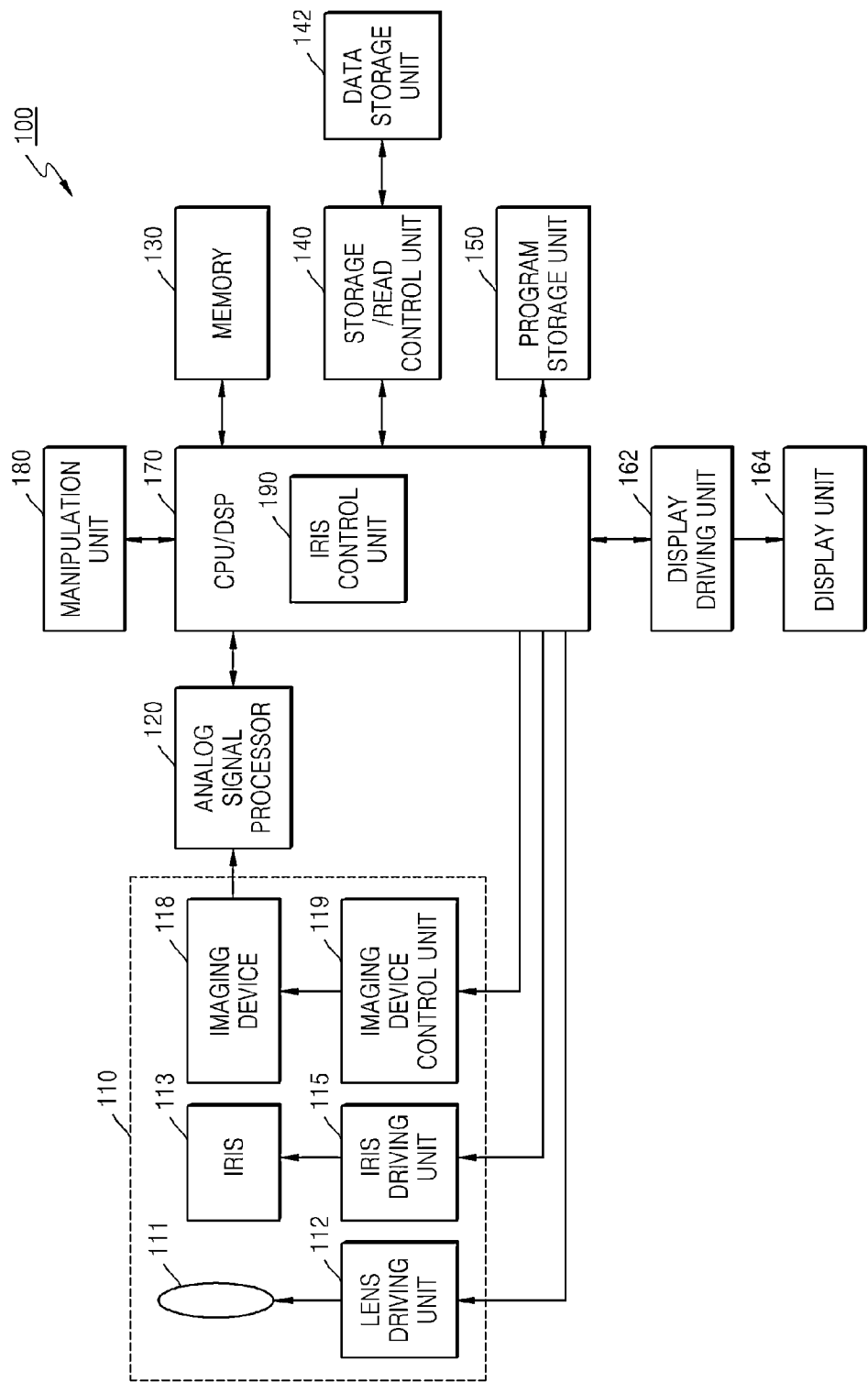
FIG. 1 illustrates an example structure of a digital photographing apparatus 100 according to an embodiment.

FIG. 1 illustrates an example structure of a digital photographing apparatus 100 according to an embodiment.

According to an embodiment, the digital photographing apparatus 100 may include a photographing unit 110, an analog signal processor 120, a memory unit 130, a storage/read control unit 140, a data storage unit 142, a program storage unit 150, a display driving unit 162, a display unit 164, a central processing unit/digital signal processor (CPU/DSP) 170, a manipulation unit 180, and an iris control unit 190.

The CPU/DSP 170 can comprehensively control all operations of the digital photographing unit 100. The CPU/DSP 170 can supply a control signal to a lens driving unit 112, an iris driving unit 115, and an imaging device control unit 119 to operate their corresponding elements.

The photographing unit 110 can be a device for generating an electrical signal of an image from incident light. The photographing unit 110 can include a lens unit 111, the lens driving unit 112, an iris 113, the iris driving unit 115, an imaging device 118, and the imaging device control unit 119.

The lens unit 111 may include groups of lenses or lenses. A location of the lens unit 111 can be adjusted by the lens driving unit 112. The lens driving unit 112 can adjust the location of the lens unit 111 according to a control signal supplied from the CPU/DSP 170.

A degree of opening and closing the iris 113 can be adjusted by the iris driving unit 115. The iris 113 can adjust an amount of light incident on the imaging device 118. According to an embodiment, the iris 113 can be an electronic iris for adjusting an iris pattern, for defining a transmission area according to an electrical signal, and a size of the transmission area. Additionally, the opening time of the transmission area of the iris 113 may be adjusted according to an electrical signal. The electrical signal may be a driving signal supplied in units of a plurality of pixels included in the iris 113 from the iris driving unit 115.

The iris control unit 190 can generate an iris control signal and can output the iris control signal to the iris driving unit 115. The iris control signal may include information about an iris pattern, information about a size of a transmission area, the opening time of an iris, and a shutter release signal. The iris control unit 190 can generate an iris control signal by determining an iris pattern and a size of a transmission area. The iris pattern and the size of the transmission area may be determined according to a user input, a photographing mode, a control signal obtained by an automatic photographing algorithm, and the like.

An optical signal, passing through the lens unit 111 and the iris 113, can reach a light-receiving surface of the imaging device 118 and can form an image of a subject on the light-receiving surface of the imaging device 118. The imaging device 118 may be a charge-coupled device (CCD) image sensor or a complementary metal-oxide semiconductor image sensor (CIS) which can convert an optical signal into an electrical signal. A sensitivity of the imaging device 118 may be adjusted by the imaging device control unit 119. The imaging device control unit 119 may control the imaging device 118 according to either a control signal which is automatically generated by an image signal input in real time or a control signal which is manually input by a user.

An exposure time of the imaging device 118 can be adjusted by a shutter (not illustrated). The shutter (not illustrated) may include a mechanical shutter which can adjust incidence of light by moving a screen and an electronic shutter which can control exposure by supplying an electrical signal to the imaging device 118.

According to an embodiment, a shutter is not additionally included, and the iris 113 may also act as a shutter. For example, the iris 113 may act as a shutter by adjusting opening time of the transmission area of the iris 113.

The analog signal processor 120 can perform noise reduction processing, gain control, waveform shaping, and analog-to-digital conversion processing on an analog signal supplied from the imaging device 118.

A signal processed by the analog signal processor 120 may be inputted to the CPU/DSP 170 via the memory unit 130 or directly without passing through the memory unit 130. The memory unit 130 can operate as a main memory unit of the digital photographing apparatus 100 and can temporarily store information which is necessary during operation of the CPU/DSP 170. The memory unit 130 can store programs such as an operating system for driving the digital photographing apparatus 100, an application system, and the like.

The digital photographing apparatus 100 can further include the display unit 164 for displaying an operation state of the digital photographing apparatus 100 or information regarding an image captured by the digital photographing apparatus 100. The display unit 164 may provide a user with visual and/or audio information. For providing visual information, the display unit 164 may be formed of, for example, a liquid crystal display (LCD) panel, an organic light-emitting display (OLED) panel, and the like. Furthermore, the display unit 164 may be a touch screen which may recognize a touch input.

The display driving unit 162 can supply a driving signal to the display unit 164.

The CPU/DSP 170 can process a received image signal and can control each constitutional element of the digital photographing apparatus 100 according to the image signal or an external input signal. The CPU/DSP 170 may reduce noise and can perform image signal processing such as gamma correction, color filter array interpolation, color matrix, color correction, and color enhancement for the input image data, to improve image quality. In addition, the CPU/DSP 170 may generate an image file by compressing image data which is obtained from image signal processing for image improvement, or may restore image data from the image file. An image compression type may be a reversible type or an irreversible type. For example, a still image may be transformed into a joint photographic experts group (JPEG) format or a JPEG 2000 format. In a case of recording a moving picture, a moving picture file may be generated by compressing a plurality of frames according to moving picture experts group (MPEG) standards. An image file may be generated, for example, according to exchangeable image file format (Exif) standards.

Image data which is outputted from the CPU/DSP 170 can be inputted to the storage/read control unit 140 directly or through the memory unit 130. The storage/read control unit 140 can store image data in the data storage unit 142 automatically or according to a signal from a user. The storage/read control unit 140 may also read image-related data from an image file which is stored in the data storage unit 142 and may input the image-related data to the display driving unit 162 via the memory unit 130 or another path so that the image may be displayed on the display unit 164. The data storage unit 142 may be detachably attached to or permanently mounted in the digital photographing apparatus 100.

Additionally, the CPU/DSP 170 may perform obscurity processing, color processing, blurring processing, edge emphasis processing, image interpretation processing, image recognition processing, or image effect processing, and the like. The image recognition processing may include face recognition processing and scene recognition processing. Also, the CPU/DSP 170 may perform processing of a display image signal to be displayed on the display unit 164. For example, the CPD/DSP 170 may perform brightness level adjustment, color correction, contrast control, edge enhancement adjustment, screen division processing, character image generation, and image synthesizing processing. The CPU/DSP 170 may be connected to an external monitor and may perform processing of a predetermined image signal to be displayed on the external monitor. The CPU/DSP 170 may transmit the processed image data to the external monitor so that the corresponding image is displayed on the external monitor.

The CPU/DSP 170 may execute a program stored in the program storage unit 150 or include an additional module to generate a control signal for controlling auto-focusing, zooming, focusing, and automatic exposure (AE) compensation, thereby supplying the control signal to the iris driving unit 115, the lens driving unit 112, and the imaging device control unit 119. Thus, the CPU/DSP 170 may control all operations of elements of the digital photographing apparatus 100 such as a shutter and a strobo.

The manipulation unit 180 can be a device via which a user may input a control signal. The manipulation unit 180 may include various function buttons, such as a shutter-release button for inputting a shutter-release signal to expose the imaging device 118 to light for a predetermined time for photographing, a power button for inputting a control signal to control a power ON or OFF, a zoom button for widening or narrowing a viewing angle according to an input, a mode selection button, and other buttons for adjusting photographing settings. The manipulation unit 180 may be implemented in any form such as a button, a keyboard, a touchpad, a touch screen, a remote control unit, and the like via which a user may input a control signal.

Figure 2:
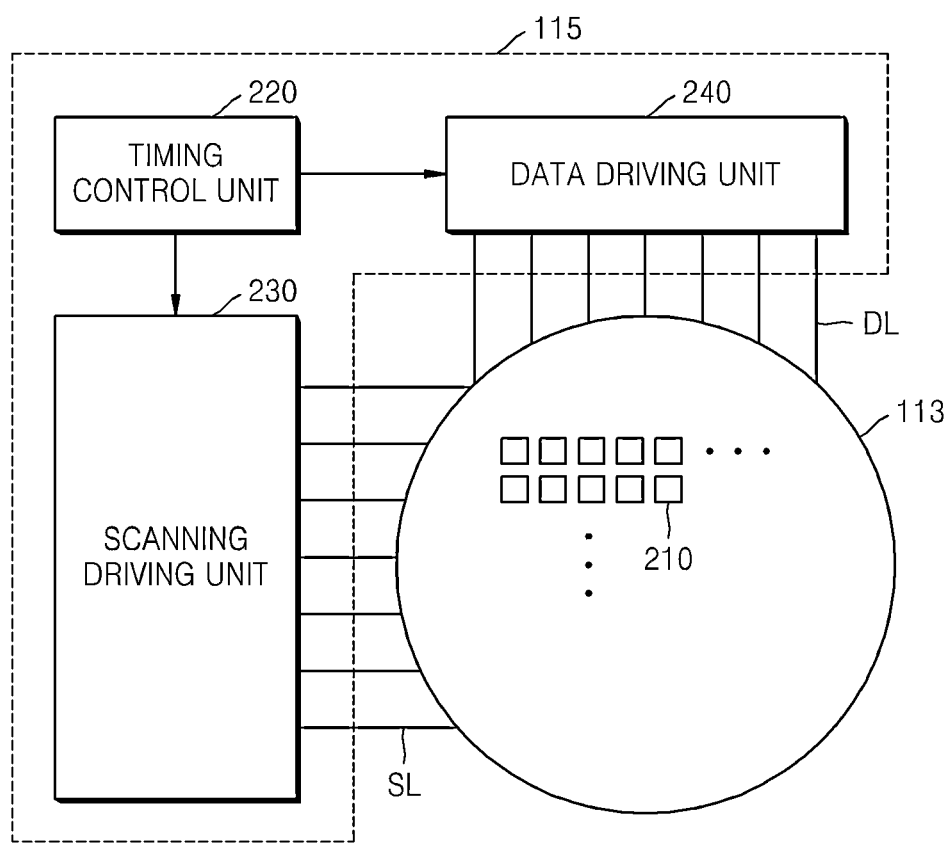
FIG. 2 illustrates a structure of an iris and an iris driving unit according to an embodiment.

FIG. 2 is a diagram illustrating a structure of the iris 113 and the iris driving unit 115 according to an embodiment.

According to an embodiment, the iris 113 may include a pixel array which includes a plurality of pixels 210. A transmission degree at the plurality of pixels 210 can be adjusted according to an iris driving signal supplied from the iris driving unit 115. The plurality of pixels 210 may each include a liquid-crystal element.

The iris driving unit 115 may include a timing control unit 220, a scanning driving unit 230, and a data driving unit 240.

The timing control unit 220 can receive an iris control signal from the iris control unit 190. The timing control unit 220 can generate a scanning driving signal to be outputted to the scanning driving unit 230 and a data driving signal to be outputted to the data driving unit 240. Then, the timing control unit 220 can output the scanning driving signal to the scanning driving unit 230 and the data driving signal to the data driving unit 240. If the iris 113 also performs as a shutter, the timing control unit 220 can synchronize with a shutter-release signal, thus, controlling the scanning driving unit 230 and the data driving unit 240 so that a transmission area can appear on the iris 113.

The iris driving unit 115 can output a scanning signal to the plurality of pixels 210 through a plurality of scanning lines SL and can output a data signal to the plurality of pixels 210 through a plurality of data lines DL. As the plurality of pixels 210 are scanned sequentially in an order of lines, the plurality of pixels 210 may receive a data signal from the data driving unit 240. By driving the iris driving unit 115, a transmission area can be formed on the iris 113 according to an iris pattern.

According to an embodiment, a transmission area in the iris 113 with a desired pattern may be formed by freely adjusting a pattern of the transmission area and an opening time of the iris 113 which can include the plurality of pixels 210. In addition, a transmission degree in the transmission area is not limited to a transmission state and a non-transmission state. The transmission degree in the transmission area may be adjusted to various states. Thus, a blurring effect and a foggy filter effect may be easily and naturally implemented by using an iris pattern.

Figure 3:
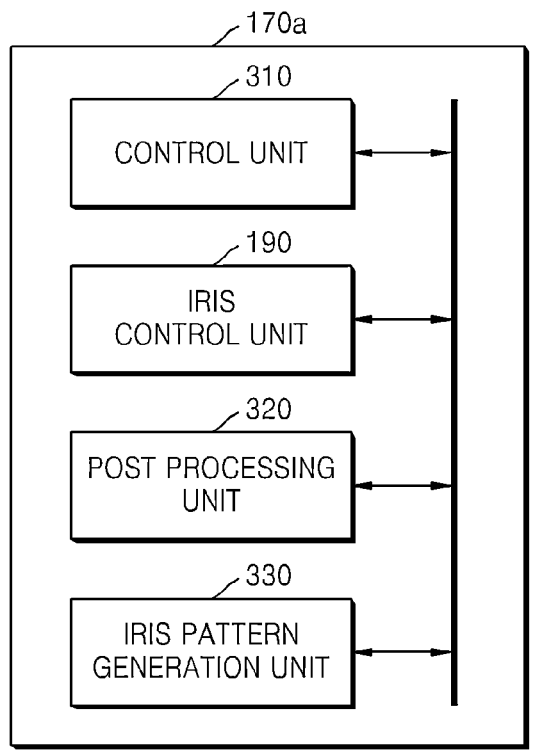
FIG. 3 is a diagram illustrating a structure of a central processing unit/digital signal processor (CPU/DSP) according to an embodiment.

FIG. 3 is a diagram illustrating a structure of a CPU/DSP 170a according to an embodiment. The CPU/DSP 170a, according to an embodiment, can include a control unit 310, the iris control unit 190, a post processing unit 320, and an iris pattern generation unit 330.

The control unit 310 can control all operations of the digital photographing apparatus 100. The control unit 310 may control each of the constitutional elements of the digital photographing apparatus 100 so that an appropriate operation is performed according to each mode of the digital photographing apparatus 100.

The iris control unit 190 may determine a shape of a transmission area in the iris 113 according to a user input. The iris control unit 190 may output iris pattern data, which can include a pattern to be displayed on the iris 113, to the timing control unit 220, thus changing an iris pattern.

According to an embodiment, the iris 113 may also act as an electronic shutter. If the iris 113 acts as a shutter, a timing signal, which can adjust opening time of the iris 113 and can synchronize with a shutter-release signal to control opening of the iris 113, may be outputted from the iris control unit 190 to the iris driving unit 115.

FIGS. 4A through 4J illustrate iris patterns according to embodiments.

As illustrated in FIGS. 4A through 4J, according to embodiments, a user may select a desired iris pattern from among various iris patterns. In an iris pattern, a transmission area and a non-transmission area can be defined.

The transmission area can be an area which partially or entirely transmits incident light. A degree of openness of the iris can be determined by a size of the transmission area. The size of the transmission area may be adjusted according to an iris opening setting (for example, f-number).

According to an embodiment, a transmission degree in a transmission area may be set to transmit partial incident light so that an effect of a foggy filter or a blurring filter is obtained.

Furthermore, according to an embodiment, it is also possible to set different degrees of transmission in the transmission area.

A non-transmission area is an area blocking out incident light.

Figure 4A:
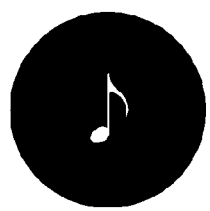
FIGS. 4A through 4J illustrate iris patterns according to embodiments.
Figure 4B:
Figure 4C:
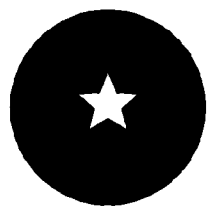
Figure 4D:
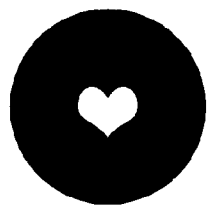
Figure 4E:
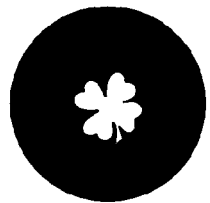
Figure 4F:
Figure 4G:
Figure 4H:
Figure 4I:
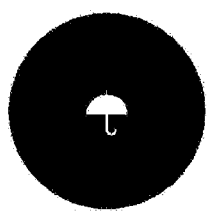
Figure 4J:

According to an embodiment, as illustrated in FIG. 4J, it is also possible to form a transmission area that has characters.

Figure 5A:
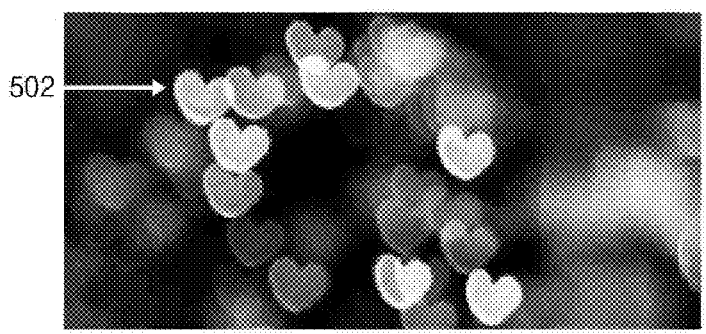
FIG. 5A illustrates an image captured using the iris pattern of FIG. 4D.

FIG. 5A illustrates an image captured using the iris pattern of FIG. 4D. The iris pattern can determine a bokeh shape which can appear on the image. Referring to FIG. 5A, heart-shaped bokehs 502 can be formed by using the heart-shaped iris pattern of FIG. 4D.

Figure 5B:
FIG. 5B illustrates an image captured using the iris pattern of FIG. 4J.

FIG. 5B illustrates an image captured using the iris pattern of FIG. 4J. Referring to FIG. 5B, bokehs 504 having characters of 'LOVE' can be formed based on the iris pattern having characters of 'LOVE' of FIG. 4J.

Referring back to FIG. 3, the CPU/DSP 170*a* can include the post processing unit 320. The post processing unit 320 can generate a first image which can be captured using a default iris pattern and a second image which can be captured using an iris pattern selected by a user. Then, the post processing unit 320 can generate a resultant image by synthesizing the first and second images. The first and second images can be captured continuously according to one shutter-release input. To capture continuously the first and second images, if an image is to be captured using an iris pattern selected by a user, the iris control unit 190 can control the iris 113 to have a default iris pattern when a shutter-release input is detected. Then, after the first image is captured, the iris control unit 190 may control the iris 113 to have an iris pattern selected by the user. The default iris pattern may be a circular iris pattern. Hereinafter, as an example, a default iris pattern is described as a circular iris pattern.

Figure 6:
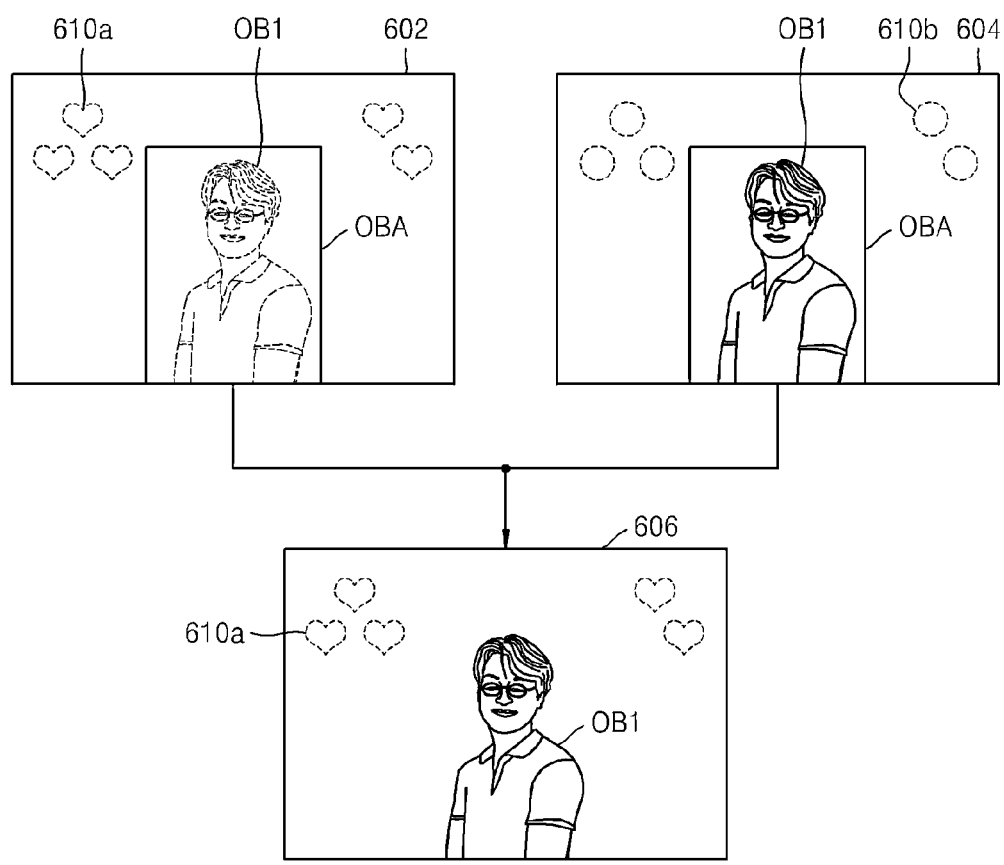
FIG. 6 illustrates a process of a post processing, according to an embodiment.

FIG. 6 illustrates a process of post processing, according to an embodiment.

In a photographing mode of using an iris pattern selected by a user, when a shutter-release input is detected, a first image 602 captured using a circular iris pattern and a second image 604 captured using an iris pattern selected by a user can be generated. The first image 602 and the second image 604 can be captured continuously according to one shutter-release input.

As illustrated in FIG. 6, the first image 602 and the second image 604 may have a main subject OB1 and bokehs 610*a* and 610*b*. If an image is captured using an iris pattern set by a user, the main subject OB1 may be photographed blurred, compared to photographing by using the circular iris pattern due to light scattering and interference. According to an embodiment, if an image is captured using an iris pattern set by a user, to prevent blurred photographing of the main object OB1, the first image 602 and the second image 604 can be synthesized so that a resultant image in which the main subject OB1 is clearly photographed may be obtained.

First, a main subject area OBA corresponding to the main object OB1 can be detected from among at least one of the first image 602 and the second image 604. As one example, the main subject OB1 may be defined as an object detected by using object recognition or object detection. As another example, a user may designate the main subject area OBA.

When the main subject area OBA is determined, image data of the main subject area OBA in the second image 604 can be synthesized with image data of the first image 602, thus generating a resultant image. As the second image 604 is captured using a circular iris pattern, the main subject OB1 may be photographed clearly as compared to the first image 602. Accordingly, by synthesizing the image data of the main subject area OBA in the second image 604 with the first image 602, the bokeh 610*a* of the iris pattern set by a user may be maintained. Also, a resultant image 606, in which the main subject OB1 is displayed clearly, may be obtained.

Referring back to FIG. 3, the CPU/DSP 170*a*, according to an embodiment, can include the iris pattern generation unit 330. The iris pattern generation unit 330 can generate an iris pattern according to a user input. Accordingly, the iris pattern generation unit 330 may provide a user interface via which a user can generate an iris pattern.

A user may generate an iris pattern directly, if a desired iris pattern does not exist among candidate iris patterns. As one example, a user may draw an iris pattern directly by using an input through the manipulation unit 180.

As another example, a user may generate an iris pattern by inputting an iris pattern file, including an iris pattern, to the digital photographing apparatus 100. The iris pattern file can be a file, which can include pre-generated iris patterns, and may be exchanged or compatible among apparatuses which use an iris pattern file in the same format.

Figure 7:
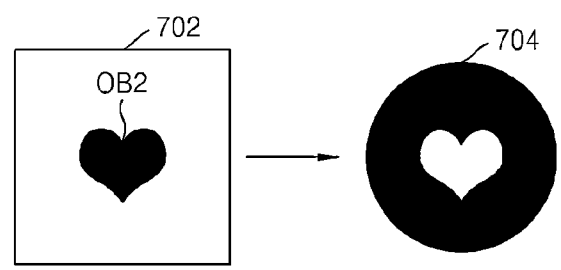
FIG. 7 illustrates a process of creating an iris pattern, according to an embodiment.

As another example, after a user photographs a predetermined object, the user may generate an iris pattern by using an image of the photographed object. FIG. 7 illustrates a process of generating an iris pattern according to an embodiment.

First, a user can generate an iris pattern image 702 by photographing an object OB2 which the user desires to generate as an iris pattern. When the iris pattern image 702 is inputted, the iris pattern generation unit 330 (Refer to FIG. 3) can recognize the object OB2 included in the iris pattern image 702 and can generate an iris pattern 704 according to a shape of the object OB2. The iris pattern generation unit 330 (Refer to FIG. 3) may generate an iris pattern, so as to set an area of the object OB2, included in the predetermined area, as a transmission area and can set the rest of the area as a non-transmission area.

As such, if a user directly generates an iris pattern, if a user generates an iris pattern by using an iris pattern file, or if a user generates an iris pattern by photographing an object, the iris pattern generation unit 330 may additionally adjust the transmission area of the iris pattern to be located at a center of the iris. Even if a user freely sets an iris pattern, it may be desirable to dispose the transmission area at the center of the iris, through which an optical axis passes. Therefore, the iris pattern generation unit 330 may adjust the location of the transmission area of the iris pattern.

Figure 8:
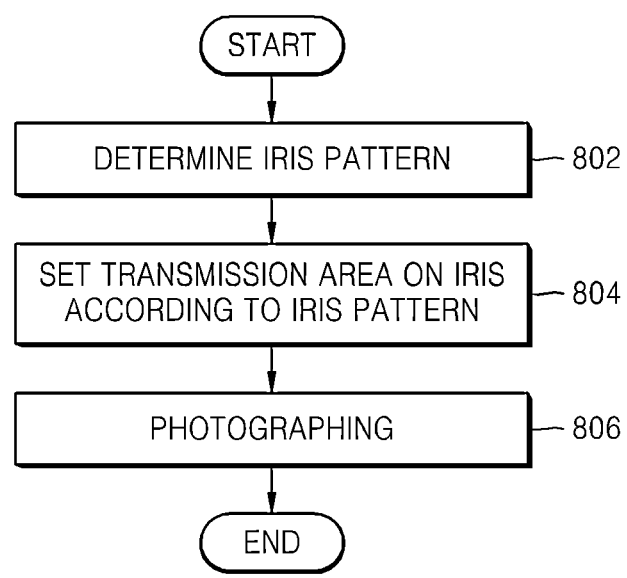
FIG. 8 is a flowchart illustrating a method of controlling a digital photographing apparatus, according to an embodiment.

FIG. 8 is a flowchart illustrating a method of controlling a digital photographing apparatus, according to an embodiment.

According to an embodiment, the method of controlling a digital photographing apparatus may be performed in a bokeh photographing mode in which a user may select an iris pattern. Furthermore, as described above, according to an embodiment, the method of controlling a digital photographing apparatus may be executed in a digital photographing apparatus 100 that can include an iris 113 which allows setting of an iris pattern according to an electrical signal.

First, in operation S802, when entering a bokeh photographing mode, an iris pattern can be determined according to a user input. The user may select a desired iris pattern from among candidate iris patterns. As another example, the user may directly generate a desired iris pattern. The user may draw an iris pattern directly, may input an iris pattern file including an iris pattern to the digital photographing apparatus 100, or may photograph a predetermined object and generate an iris pattern according to a shape of the object.

In operation S804, if the iris pattern is determined, a transmission area of the iris 113 can be set according to the iris pattern. In operation S806, when the iris pattern is displayed on the iris 113, photographing can be executed.

According to embodiments, a user may apply various effects and can capture an image by freely adjusting an iris pattern and a size of a transmission area according to an electrical signal.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. It will also be recognized that the terms "comprises," "comprising," "includes," "including," "has," and "having," as used herein, are specifically intended to be read as open-ended terms of art. The words "mechanism" and "element" are used broadly and are not limited to mechanical or physical embodiments, but may include software routines in conjunction with processors, etc. No item or component is essential to the practice of the invention unless the element is specifically described as "essential" or "critical". Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Also, the invention may employ any number of conventional techniques for electronics configuration, signal processing and/or control, data processing and the like. The apparatus described herein may comprise a processor, a memory for storing program data to be executed by the processor, a permanent storage such as a disk drive, a communications port for handling communications with external devices, and user interface devices, including a display, keys, etc.

The present invention may be embodied as computer-readable code in a computer-readable recording medium. The computer-readable recording medium may be any recording apparatus capable of storing data that is read by a computer system.

The computer-readable code may be embodied in such a manner that a method of controlling a digital photographing apparatus, according to the present invention, may be performed when the computer-readable code is read and executed by a processor, such as the CPU/DSP 170. The computer-readable code may be written in various programming languages.

When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. Examples of the computer-readable recording medium can also include carrier waves (such as data transmission through the Internet). The computer readable recording media may also be distributed over network coupled computer systems so that the computer readable code is stored and executed in a distributed fashion. This media can be read by the computer, stored in the memory, and executed by the processor. Where elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Functional aspects may be implemented in algorithms that execute on one or more processors. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

While the present invention has been particularly shown and described with reference to exemplary embodiments thereof, it will be understood by those skilled in the art that various changes in form and details may be made therein and that numerous modifications and adaptations will be readily apparent to those of ordinary skill in this art without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A digital photographing apparatus comprising:
a lens unit;

an iris in which an iris pattern, that defines a transmission area of incident light according to a signal, is determined;

an imaging device that converts the incident light into an electrical signal;

an iris control unit which controls to form the iris pattern in the iris; and a post processing unit which generates a first image captured using a default iris pattern, a second image captured using an iris pattern determined according to a user input signal, and a resultant image by synthesizing the first and second images.

2. The digital photographing apparatus of claim 1, wherein the iris control unit determines a selected shape of the iris pattern according to a user input.

3. The digital photographing apparatus of claim 1, wherein the iris control unit determines a size of the transmission area according to an iris opening setting.

4. The digital photographing apparatus of claim 1, wherein the iris control unit adjusts a transmission degree of the transmission area to three or more states.

5. The digital photographing apparatus of claim 1, further comprising:

a subject detection unit that detects a main subject; and a post processing unit that provides an improved resolution of the main subject.

6. The digital photographing apparatus of claim 1, further comprising an iris pattern generation unit that generates the iris pattern according to a shape of an object in an input image.

7. A method of controlling a digital photographing apparatus, wherein the digital photographing apparatus comprises an iris in which an iris pattern, for defining a transmission area of incident light according to an electrical signal, is determined, the method comprising:

determining the iris pattern according to a user input signal;

controlling to form the iris pattern in the iris;

capturing an image;

generating a first image by photographing using a default iris pattern;

generating a second image by photographing using the iris pattern determined according to the user input signal; and generating a resultant image by synthesizing the first and second images.

8. The method of claim 7, further comprising determining a size of the transmission area according to an iris opening setting.

9. The method of claim 7, further comprising adjusting a transmission degree of the transmission area to three or more states.

10. The method of claim 7, further comprising:

detecting a main subject from a captured image; and improving a resolution of the main subject.

11. The method of claim 7, further comprising generating the iris pattern according to a shape of an object in an input image.

12. A non-transitory computer-readable recording medium for storing computer program code which performs a method of controlling a digital photographing apparatus when the computer program code is read and executed by a processor, wherein the digital photographing apparatus comprises an iris in which an iris pattern, for defining a transmission area of incident light according to an electrical signal, is determined, and wherein the method of controlling the digital photographing apparatus comprises:

determining the iris pattern according to a user input signal;

controlling to form the iris pattern in the iris;

capturing an image;

generating a first image by photographing using a default iris pattern;

generating a second image by photographing using the iris pattern determined according to the user input signal; and generating a resultant image by synthesizing the first and second images.

13. The non-transitory computer-readable recording medium of claim 12, wherein the method of controlling the digital photographing apparatus further comprises determining a size of the transmission area according to an iris opening setting.

14. The non-transitory computer-readable recording medium of claim 12, wherein the method of controlling the digital photographing apparatus further comprises adjusting a transmission degree of the transmission area to three or more states.

15. The non-transitory computer-readable recording medium of claim 12, wherein the method of controlling the digital photographing apparatus further comprises:

detecting a main subject from the captured image; and improving a resolution of the main subject.

16. The non-transitory computer-readable recording medium of claim 12, wherein the method of controlling the digital photographing apparatus further comprises generating the iris pattern according to a shape of an object in an input image.

* * * * *